(12) United States Patent
Schafer et al.

(10) Patent No.: US 12,153,870 B2
(45) Date of Patent: Nov. 26, 2024

(54) SYSTEM, METHOD, AND COMPUTER PROGRAM PRODUCT FOR IDENTIFYING EVENTS AND REPRESENTING A PLURALITY OF EVENTS IN AN INTERACTIVE GRAPHICAL USER INTERFACE

(71) Applicant: Clearbrief, Inc., Seattle, WA (US)

(72) Inventors: Jacqueline Grace Schafer, Seattle, WA (US); Jose Demetrio Saura, Seattle, WA (US); Tovi Jordan Newman, Seattle, WA (US); Kristina Marian Hollingshead, Seattle, WA (US)

(73) Assignee: Clearbrief, Inc., Seattle, WA (US)

( * ) Notice: Subject to any disclaimer, the term of this patent is extended or adjusted under 35 U.S.C. 154(b) by 0 days.

(21) Appl. No.: 18/637,921

(22) Filed: Apr. 17, 2024

(65) Prior Publication Data
US 2024/0265193 A1    Aug. 8, 2024

Related U.S. Application Data

(63) Continuation of application No. PCT/US2022/046966, filed on Oct. 18, 2022.
(Continued)

(51) Int. Cl.
*G06F 40/106* (2020.01)
*G06F 3/0482* (2013.01)
(Continued)

(52) U.S. Cl.
CPC .......... *G06F 40/106* (2020.01); *G06F 3/0482* (2013.01); *G06F 16/93* (2019.01);
(Continued)

(58) Field of Classification Search
CPC ...... G06F 40/106; G06F 16/93; G06F 40/134; G06F 40/279; G06F 40/205; G06F 40/169; G06F 3/0482
See application file for complete search history.

(56) References Cited

U.S. PATENT DOCUMENTS

| 9,632,654 B1 | 4/2017 | Elassaad |
| 9,852,195 B2 | 12/2017 | Ma et al. |

(Continued)

FOREIGN PATENT DOCUMENTS

| CN | 110879842 A | 3/2020 |
| CN | 111611396 A | 9/2020 |

(Continued)

*Primary Examiner* — Scott T Baderman
*Assistant Examiner* — Mario M Velez-Lopez
(74) *Attorney, Agent, or Firm* — The Webb Law Firm

(57) ABSTRACT

Provided are systems, methods, and computer program products for representing a plurality of events in an interactive graphical user interface. The system includes at least one processor programmed or configured to parse at least one textual document to identify a plurality of events related to at least one entity, determine a temporal parameter for each event of the plurality of events based on the at least one textual document, order the plurality of events into a sequence based on the temporal parameter for each event, and generate an interactive graphical user interface comprising a visual representation of the plurality of events on a user device based on the sequence, the visual representation of the plurality of events linked to a textual document of the at least one textual document.

30 Claims, 7 Drawing Sheets

Related U.S. Application Data

(60) Provisional application No. 63/256,814, filed on Oct. 18, 2021.

(51) Int. Cl.
   *G06F 16/93* (2019.01)
   *G06F 40/134* (2020.01)
   *G06F 40/169* (2020.01)
   *G06F 40/205* (2020.01)
   *G06F 40/279* (2020.01)

(52) U.S. Cl.
   CPC .......... *G06F 40/134* (2020.01); *G06F 40/169* (2020.01); *G06F 40/205* (2020.01); *G06F 40/279* (2020.01)

(56) References Cited

U.S. PATENT DOCUMENTS

| | | | | |
|---|---|---|---|---|
| 11,423,073 | B2* | 8/2022 | Kikin-Gil | G06F 3/165 |
| 11,941,237 | B2* | 3/2024 | Weskamp | G06F 21/10 |
| 2004/0027349 | A1* | 2/2004 | Landau | G06F 16/26 |
| | | | | 345/440 |
| 2008/0243825 | A1 | 10/2008 | Staddon et al. | |
| 2009/0326926 | A1* | 12/2009 | Landau | G06F 16/26 |
| | | | | 704/E11.001 |
| 2010/0318398 | A1* | 12/2010 | Brun | G06Q 10/109 |
| | | | | 705/7.18 |
| 2013/0054613 | A1* | 2/2013 | Bishop | G06F 16/93 |
| | | | | 707/E17.046 |
| 2017/0277779 | A1* | 9/2017 | Vogel | G06F 40/295 |
| 2017/0351754 | A1* | 12/2017 | Devarakonda | G06F 16/447 |
| 2019/0354579 | A1 | 11/2019 | Kerr et al. | |
| 2020/0090053 | A1 | 3/2020 | Silverman et al. | |
| 2020/0134757 | A1 | 4/2020 | Raphael et al. | |
| 2020/0151392 | A1 | 5/2020 | Crabtree et al. | |
| 2020/0394057 | A1* | 12/2020 | Dobson | G06F 3/1454 |
| 2022/0343250 | A1* | 10/2022 | Tremblay | G06Q 10/0633 |

FOREIGN PATENT DOCUMENTS

| | | |
|---|---|---|
| CN | 112581327 A | 3/2021 |
| CN | 112632223 A | 4/2021 |

* cited by examiner

SYSTEM, METHOD, AND COMPUTER PROGRAM PRODUCT FOR IDENTIFYING EVENTS AND REPRESENTING A PLURALITY OF EVENTS IN AN INTERACTIVE GRAPHICAL USER INTERFACE

CROSS REFERENCE TO RELATED APPLICATIONS

This application is a continuation of International Patent Application No. PCT/US22/46966, filed Oct. 18, 2022, which claims priority to U.S. Provisional Patent Application No. 63/256,814, filed Oct. 18, 2021, the disclosures of which are hereby incorporated by reference in their entireties.

BACKGROUND

1. Field

This disclosure relates generally to identifying events in electronic documents and, in non-limiting embodiments, to systems, methods, and computer program products for identifying events and representing a plurality of events in an interactive graphical user interface.

2. Technical Considerations

Law firms prepare legal documents, such as legal briefs, pleadings, and opinions. Their clients also prepare legal documents, such as internal memorandums prepared by in-house counsel or a human resources report relating to a harassment or other employee-related complaint, for example. Such documents are also prepared for courts, police officers, insurance claims, and/or the like. These types of legal documents need to report facts accurately and consistently.

A timeline provides a clear visual presentation of a case. It helps readers understand the circumstances and the chronological order of key facts. There are different tools generating a timeline in different formats and with a variety of visual effects. Existing timeline generation tools (Adobe Flash®, PowerPoint™, Keynote®, BeeDocs) are limited to the visual representation of timeline data. There is manual labor involved in selecting key dates and entering data in these tools. Moreover, existing e-discovery tools allow users to manually add documents to an interface to create a chronology of documents, but such tools are prone to human error and do not involve a primary document being edited in a word processing application.

SUMMARY

According to non-limiting embodiments or aspects, provided is a computer-implemented method for representing a plurality of events in an interactive graphical user interface, comprising: parsing at least one textual document to identify a plurality of events related to at least one entity; determining a temporal parameter for each event of the plurality of events based on the at least one textual document; ordering the plurality of events into a sequence based on the temporal parameter for each event; and generating an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

According to non-limiting embodiments or aspects, provided is a system for representing a plurality of events in an interactive graphical user interface, comprising: at least one processor programmed or configured to: parse at least one textual document to identify a plurality of events related to at least one entity; determine a temporal parameter for each event of the plurality of events based on the at least one textual document; order the plurality of events into a sequence based on the temporal parameter for each event; and generate an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

According to non-limiting embodiments or aspects, provided is a computer program product comprising a non-transitory computer-readable medium including program instructions that, when executed by at least one processor, cause the at least one processor to: parse at least one textual document to identify a plurality of events related to at least one entity; determine a temporal parameter for each event of the plurality of events based on the at least one textual document; order the plurality of events into a sequence based on the temporal parameter for each event; and generate an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

In non-limiting embodiments or aspects, the visual representation of the plurality of events comprises a plurality of selectable options linked to portions of the textual document or the at least one other document such that, when selected, a corresponding portion of the textual document or the at least one other document is annotated. In non-limiting embodiments or aspects, displaying the at least a portion of the textual document or at least one other document comprises at least one of the following: highlighting a subsection of text, emphasizing a subsection of text, enlarging a subsection of text, displaying a subsection of text in a pop-up window, displaying a subsection of text in a frame of the interactive user interface, or any combination thereof. In non-limiting embodiments or aspects, the interactive graphical user interface is configured to display the at least one other document in response to user interaction with the visual representation, the at least one other document comprising at least one of the following: an article, a statute, a court order, an exhibit, a note, or any combination thereof. In non-limiting embodiments or aspects, the method further includes detecting at least one key date or time period associated with at least a subset of events of the plurality of events, wherein the visual representation comprises the at least one key date or time period.

In non-limiting embodiments or aspects, the visual representation identifies at least one event of the plurality of events in association with at least one entity of the plurality of entities. In non-limiting embodiments or aspects, the method further includes sharing the interactive user interface with at least one other user. In non-limiting embodiments or aspects, the interactive user interface is generated in a frame of a word processing application. In non-limiting embodiments or aspects, the temporal parameter for each event comprises at least one of the following: a specific time, a specific date, a time range, a date range, a relative time, a relative date, or any combination thereof. In non-limiting embodiments or aspects, the method further includes generating a graph data structure comprising a plurality of nodes representing a plurality of entities and relationships between entities, the plurality of entities including the at least one entity. In non-limiting embodiments or aspects, the method further comprises: generating a textual summary based on the at least one document and the sequence.

In non-limiting embodiments or aspects, the method further includes editing the at least one textual document based on user input. In non-limiting embodiments or aspects, the at least one textual document is edited with a word processing application that displays the at least one textual document while the parsing of the at least one textual document is performed. In non-limiting embodiments or aspects, the word processing application is configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface. In non-limiting embodiments or aspects, the word processing application comprises a plug-in extension configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface.

In non-limiting embodiments or aspects, the at least one entity comprises at least one of the following: a person, an organization, a place, or any combination thereof. In non-limiting embodiments or aspects, the method further includes generating at least one event entity from an event of the plurality of events, the event entity comprising a plurality of portions of the at least one textual document linked to the event. In non-limiting embodiments or aspects, the event entity further comprises a plurality of event parameters, the event parameters comprising at least one of the following: event type, event date, event subject, event object, event action, event participants, or any combination thereof.

In non-limiting embodiments or aspects, parsing the at least one textual document to identify the plurality of events comprises: determining, for each portion of the at least one textual document associated with an event of the plurality of events, if the event corresponds to an existing event in an event database; and in response to determining that the event corresponds to the existing event, linking the portion of the at least one textual document and the existing event into an event entity. In non-limiting embodiments or aspects, parsing the at least one textual document to identify the plurality of events comprises: determining, for each portion of the at least one textual document associated with an event of the plurality of events, if the event corresponds to an existing event in an event database; and in response to determining that the event does not correspond to an existing event, creating a new event entity in the event database and linking the portion of the at least one textual document to the new event entity. In non-limiting embodiments or aspects, parsing the at least one textual document to identify the plurality of events is based on an event database comprising a plurality of event entities. In non-limiting embodiments or aspects, the method further includes: filtering the event database based on at least one of the following: event entities identified in a target document of the at least one textual document, event entities identified in a secondary document cited in the target document, or any combination thereof.

Other non-limiting embodiments or aspects will be set forth in the following numbered clauses:

Clause 1: A computer-implemented method for representing a plurality of events in an interactive graphical user interface, comprising: parsing at least one textual document to identify a plurality of events related to at least one entity; determining a temporal parameter for each event of the plurality of events based on the at least one textual document; ordering the plurality of events into a sequence based on the temporal parameter for each event; and generating an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

Clause 2: The computer-implemented method of clause 1, wherein the visual representation of the plurality of events comprises a plurality of selectable options linked to portions of the textual document or the at least one other document such that, when selected, a corresponding portion of the textual document or the at least one other document is annotated.

Clause 3: The computer-implemented method of clauses 1 or 2, wherein displaying the at least a portion of the textual document or at least one other document comprises at least one of the following: highlighting a subsection of text, emphasizing a subsection of text, enlarging a subsection of text, displaying a subsection of text in a pop-up window, displaying a subsection of text in a frame of the interactive graphical user interface, or any combination thereof.

Clause 4: The computer-implemented method of any of clauses 1-3, wherein the interactive graphical user interface is configured to display the at least one other document in response to user interaction with the visual representation, the at least one other document comprising at least one of the following: an article, a statute, a court order, an exhibit, a note, or any combination thereof.

Clause 5: The computer-implemented method of any of clauses 1-4, further comprising detecting at least one key date or time period associated with at least a subset of events of the plurality of events, wherein the visual representation comprises the at least one key date or time period.

Clause 6: The computer-implemented method of any of clauses 1-5, wherein the visual representation identifies at least one event of the plurality of events in association with at least one entity of a plurality of entities.

Clause 7: The computer-implemented method of any of clauses 1-6, further comprising sharing the interactive graphical user interface with at least one other user.

Clause 8: The computer-implemented method of any of clauses 1-7, wherein the interactive graphical user interface is generated in a frame of a word processing application.

Clause 9: The computer-implemented method of any of clauses 1-8, further comprising: generating a textual summary based on the at least one textual document and the sequence.

Clause 10: The computer-implemented method of any of clauses 1-9, wherein the word processing application comprises a plug-in extension configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface.

Clause 11: The computer-implemented method of any of clauses 1-10, wherein parsing the at least one textual document to identify the plurality of events comprises: determining, for each portion of the at least one textual document associated with an event of the plurality of events, if the event corresponds to an existing event in an event database; and in response to determining that the event corresponds to the existing event or does not correspond to the existing event, determining to: (i) link the portion of the at least one textual document to an event entity for the existing event or (ii) create a new event entity in the event database and link the portion of the at least one textual document to the new event entity.

Clause 12: A system for representing a plurality of events in an interactive graphical user interface, comprising: at least one processor programmed or configured to: parse at least one textual document to identify a plurality of events related to at least one entity; determine a temporal parameter for each event of the plurality of events based on the at least one textual document; order the plurality of events into a sequence based on the temporal parameter for each event; and generate an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

Clause 13: The system of clause 12, wherein the visual representation of the plurality of events comprises a plurality of selectable options linked to portions of the textual document or the at least one other document such that, when selected, a corresponding portion of the textual document or the at least one other document is annotated.

Clause 14: The system of clauses 12 or 13, wherein displaying the at least a portion of the textual document or at least one other document comprises at least one of the following: highlighting a subsection of text, emphasizing a subsection of text, enlarging a subsection of text, displaying a subsection of text in a pop-up window, displaying a subsection of text in a frame of the interactive graphical user interface, or any combination thereof.

Clause 15: The system of any of clauses 12-14, wherein the interactive graphical user interface is configured to display the at least one other document in response to user interaction with the visual representation, the at least one other document comprising at least one of the following: an article, a statute, a court order, an exhibit, a note, or any combination thereof.

Clause 16: The system of any of clauses 12-15, wherein the at least one processor is further programmed or configured to detect at least one key date or time period associated with at least a subset of events of the plurality of events, and wherein the visual representation comprises the at least one key date or time period.

Clause 17: The system of any of clauses 12-16, wherein the visual representation identifies at least one event of the plurality of events in association with at least one entity of a plurality of entities.

Clause 18: The system of any of clauses 12-17, wherein the interactive graphical user interface is generated in a frame of a word processing application.

Clause 19: The system of any of clauses 12-18, wherein the at least one processor is further programmed or configured to: generate a textual summary based on the at least one textual document and the sequence.

Clause 20: The system of any of clauses 12-19, wherein the word processing application comprises a plug-in extension configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface.

Clause 21: The system of any of clauses 12-20, wherein parsing the at least one textual document to identify the plurality of events comprises: determining, for each portion of the at least one textual document associated with an event of the plurality of events, if the event corresponds to an existing event in an event database; and in response to determining that the event corresponds to the existing event or does not correspond to the existing event, determining to: (i) link the portion of the at least one textual document to an event entity for the existing event or (ii) to create a new event entity in the event database and link the portion of the at least one textual document to the new event entity.

Clause 22: A computer program product comprising a non-transitory computer-readable medium including program instructions that, when executed by at least one processor, cause the at least one processor to: parse at least one textual document to identify a plurality of events related to at least one entity; determine a temporal parameter for each event of the plurality of events based on the at least one textual document; order the plurality of events into a sequence based on the temporal parameter for each event; and generate an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

Clause 23: The computer program product of clause 22, wherein the visual representation of the plurality of events comprises a plurality of selectable options linked to portions of the textual document or the at least one other document such that, when selected, a corresponding portion of the textual document or the at least one other document is annotated.

Clause 24: The computer program product of clauses 22 or 23, wherein displaying the at least a portion of the textual document or at least one other document comprises at least one of the following: highlighting a subsection of text, emphasizing a subsection of text, enlarging a subsection of text, displaying a subsection of text in a pop-up window, displaying a subsection of text in a frame of the interactive graphical user interface, or any combination thereof.

Clause 25: The computer program product of any of clauses 22-24, wherein the interactive graphical user interface is configured to display the at least one other document in response to user interaction with the visual representation, the at least one other document comprising at least one of the following: an article, a statute, a court order, an exhibit, a note, or any combination thereof.

Clause 26: The computer program product of any of clauses 22-25, wherein the program instructions further cause the at least one processor to detect at least one key date or time period associated with at least a subset of events of the plurality of events, and wherein the visual representation comprises the at least one key date or time period.

Clause 27: The computer program product of any of clauses 22-26, wherein the visual representation identifies at least one event of the plurality of events in association with at least one entity of a plurality of entities.

Clause 28: The computer program product of any of clauses 22-27, wherein the interactive graphical user interface is generated in a frame of a word processing application.

Clause 29: The computer program product of any of clauses 22-28, wherein the program instructions further cause the at least one processor to: generate a textual summary based on the at least one textual document and the sequence.

Clause 30: The computer program product of any of clauses 22-29, wherein the word processing application comprises a plug-in extension configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface.

Clause 31: The computer program product of any of clauses 22-30, wherein parsing the at least one textual document to identify the plurality of events comprises: determining, for each portion of the at least one textual document associated with an event of the plurality of events, if the event corresponds to an existing event in an event database; and in response to determining that the event corresponds to the existing event or does not correspond to the existing event, determining to: (i) link the portion of the at least one textual document to an event entity for the existing event or (ii) to create a new event entity in the event database and link the portion of the at least one textual document to the new event entity.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DESCRIPTION OF THE PREFERRED EMBODIMENTS

Figure 1A:
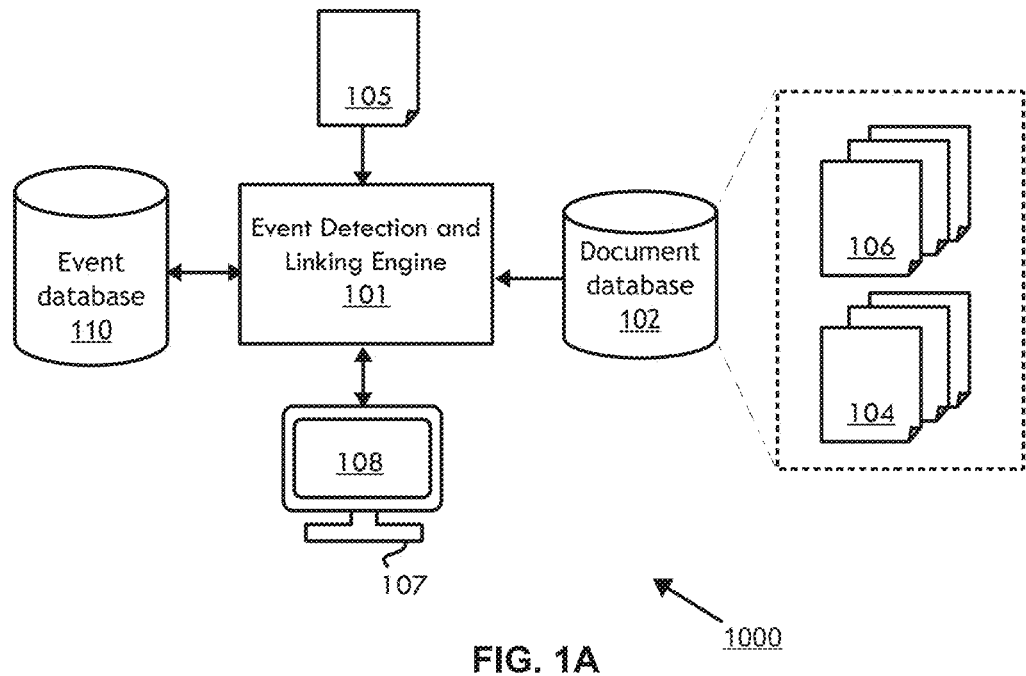
FIG. 1A is a schematic diagram of a system for identifying events in electronic documents and for representing events in an interactive graphical user interface according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be one or more processors, mobile devices, stationary computers, server computers, or the like. As used herein, the term "server computer" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first processor that is recited as performing a first step or function may refer to the same or different processor recited as performing a second step or function.

Non-limiting embodiments provide a system, method, and computer program product for identifying events in electronic documents and for representing events in an interactive graphical user interface (GUI). Non-limiting embodiments provide for improved word processing applications and databases through the generation of graph data structures that enable dynamic data applications, including a timeline representation of events identified from one or more documents. Moreover, the interactive GUI(s) enabled by non-limiting embodiments described herein permit users to generate customizable views and arrangements by directly interacting with a word processing application and dynamically updating based on changes. Various other improvements and advantages may be realized with the systems, methods, and computer program products described herein.

FIG. 1A depicts a system 1000 for identifying events and representing events in an interactive GUI according to some non-limiting embodiments. The system 1000 includes an event detection and linking engine 100, which may include one or more computing devices and/or software applications executed by one or more computing devices. The event detection and linking engine 100 is in communication with a document database 102 which may be local or remote to the event detection and linking engine 100. The document database 102 may include one or more databases arranged on one or more data storage devices in various locations. In non-limiting embodiments, the document database 102 includes legal documents 106 (e.g., briefs, pleadings, and other writings) and evidentiary documents 104. It will be appreciated that various document databases may be in communication with the event detection and linking engine 100. For example, a public and/or private document database (not shown in FIG. 1A) may include court databases, legal authority databases, information resources, and/or the like and may be accessed via one or more Application Program Interfaces (APIs) allowing the document database(s) to be queried over a network connection (e.g., over the Internet).

With continued reference to FIG. 1A, the event detection and linking engine 100 is also in communication with an event database 110 which may be local or remote to the event detection and linking engine 100. The event database 110 stores one or more graph data structures and/or other types of data structures representing entities and relationships between entities, including event entities. For example, the event database 110 may store data representing a plurality of event entities, where each event entity represents an event and may include event parameters such as event type, event date, event subject, event object, event action, event participants, and/or the like. In non-limiting embodiments, an event entity includes structured data and/or a subset of associated data within a data structure that includes event data for one or more event parameters.

Still referring to FIG. 1A, the event detection and linking engine 100 is configured to process one or more target documents 105 (e.g., a textual document). The target document 105 may be a brief, a section of a brief (e.g., a statement or summary of facts and/or a section selected by the user), a pleading, a memorandum, and/or the like. The target document 105 in some examples may be part of the legal documents 106 in the document database 102. In non-limiting embodiments, the event detection and linking engine 100 is configured to parse the target document 105 to identify events (e.g., mentions of and/or references to events), link portions of the document 105 that relate to the same event into a single event entity (a new event entity or an existing event entity from the event database 110), and generate a timeline of events on an interactive graphical user interface (GUI) 108 of a user computing device 107.

In non-limiting embodiments, the event detection and linking engine 100 is configured to differentiate between unique events (e.g., different event entities). For example, if multiple mentions of an event (text strings mentioning and/or referencing an event, such as portions and/or segments of the textual document 105) appear in the textual document 105, all of those separate mentions may be associated to the same event entity. This may be performed through an individualized assessment of relevance, in which each portion of the document is separately processed and analyzed to assess whether it falls within the scope of an existing event entity and, in response to determining that it does, associating (e.g., linking) the mention (e.g., a segment of the textual document 105) to the event entity. During the parsing, the event entities are stored in an event database 110, such as a knowledge graph. Determining whether a particular string relates to an existing event in the database involves determining which mentions of an event are associated with an existing event entity of the event database 110 (e.g., querying the event database based on the mention) and which mentions are not associated with an existing event entity. If a mention is not associated with an existing event entity, a new event entity may be automatically generated and added to the event database 110. Such determinations avoid the creation of duplicate records for a same event that is mentioned multiple times, thus saving computational resources from being expended unnecessarily.

In non-limiting embodiments, the scope of the event entities in the event database 110 that are compared to the portions of the textual document 105 may be limited to those that are related to the author of the document 105. For example, the scope of event entities may include event entities that were directly parsed from the textual document 105 being edited by the author (the primary textual document) and/or event entities that were parsed from supporting documents (e.g., citations from the primary textual document to documents in the document database 102). By limiting the scope of analysis during the parsing, improvements are realized in the performance of associating (e.g., linking) mentions to event entities through saving computational resources that would otherwise be expended.

With continued reference to FIG. 1A, the event detection and linking engine 100 may be configured to parse at least one textual document 105 to identify a plurality of events relating to at least one entity. For example, a user may identify a person, place, organization, or the like to identify a plurality of associated events involving that entity. In some examples, parsing the document 105 may involve determining, for each portion of the textual document 105 associated with an event of the plurality of events, if the event corresponds to an existing event in the event database 110. In some examples, in response to determining that the event corresponds to the existing event, the event detection and linking engine 100 may automatically associate (e.g., link via a data structure) the portion of the at least one textual document and the existing event into an event entity. Likewise, in some examples, in response to determining that the event does not correspond to an existing event, the event detection and linking engine 100 may automatically generate a new event entity in the event database and link the portion of the at least one textual document to the new event entity. An event entity may be defined by a plurality of parameters, such as but not limited to event type, event date, event subject (e.g., a person or organization who initiated or controlled the event, or a place the event took place), event object (e.g., who or what the event was for), event action or predicate (e.g., a marriage, a movement, etc.), event participants, or any combination thereof.

With continued reference to FIG. 1A, in non-limiting embodiments the event detection and linking engine 100 may be configured to determine one or more temporal parameters for each event of the plurality of events based on the at least one textual document, order (e.g., sort) the plurality of events into a sequence based on the temporal parameter for each event, and generate a GUI 108 comprising a visual representation of the plurality of events on a user device based on the sequence. In non-limiting embodiments, the temporal parameter(s) for each event may include a time and/or date. In non-limiting embodiments, the temporal parameter(s) for each event may include a relative parameter (e.g., indicating that the event occurred before, after, or during one or more other events).

In non-limiting embodiments, the timespan (e.g., two temporal parameters where one parameter represents the start time and the other represents the end time) may be determined to be as short as possible (e.g., if multiple temporal parameters are determined, the event detection and linking engine 100 may select the temporal parameters representing the shortest timespan from the multiple options). In some examples, there might not be enough data available to determine a specific time or timespan, in which case the system may determine the most likely (e.g., probable) start and end times based on the available data. For example, one or more predictive models may be used to determine a timespan. The temporal parameters may be determined as part of forming or defining an event entity. For example, if the textual document includes the statement: "After getting divorced, Mary purchased a car and then moved to Florida in May of 2020," the system does not have enough information to determine from that sentence when Mary purchased the car but can determine that the purchase was before May 2020 and after getting divorced. The data for this event (e.g., event entity) may include a data structure as follows: Event=[Subject: Mary, Predicate: Purchase, Object: Car, Timespan: (<divorce date>, <May 2020>)].

In the above-mentioned example fact pattern involving Mary, after getting divorced Mary purchased a car and then moved to Florida in May of 2020. Thus, there are at least three events. The first event (e.g., "Event1") may include the following parameters: [Subject: Mary, Predicate: Divorce, object: UNK, Timespan: (UNK, May 2020)], the second event (e.g., "Event2") may include the following parameters: [Subject: Mary, Predicate: Purchase, object: car, Timespan(<divorce date>, May 2020)], and the third event (e.g., "Event3") may include the following parameters: [Subject: Mary, Predicate: Travel, object: Florida, Timespan (<divorce date>, May 2020)]. The word "After", when detected, may cause the algorithm to determine that Event1 comes before Event2, and the word "Then", when detected, may cause the algorithm to determine that Event2 comes before Event3. The events may be linked to form a sequence of events as follows: Event1→Event2→Event3. Linking events may include including a pointer as a parameter in one event that identifies a preceding or succeeding event and/or recording the sequence in a database.

In non-limiting embodiments, when the events are shown on a timeline, even if the system has not determined all of the dates the sequence may still be accurate based on the relative sequence of each of the events with respect to the other events. To determine more precise, narrower timespans, the system may be configured to process other documents (e.g., from document database 102) and link events together. For example, if there is a record document that has information about when a car was purchased, the system may be able to extract a fourth event (e.g., "Event4") with the following parameters: [Subject Mary Doe, Predicate Purchase, object car, Timespan(Apr. 10, 2020, Apr. 10, 2020)]. By comparing the subject, type, and object, the system may match this event to the second event (e.g., "Event2") based on matching parameters and update the time span for the second event.

In non-limiting embodiments, a machine-learning model may be used to score the events based on how likely (e.g., probable) they are to be related. This may take the form of a decision tree, for example, represented as: prob_related=Model.predict(Event2, [Event1, Event3, Event4, . . . ]). Various other representations, variables, and functions may be used. Assigning probability scores allows the system to pick those events that have a probability higher than a certain threshold as candidates. If the results are ambiguous (e.g., probability scores failing to satisfy a threshold), the user might be prompted to provide feedback as to whether or not events are related in non-limiting embodiments. User feedback may then be used to improve the machine-learning model by adjusting and/or training the model.

In non-limiting embodiments, the system 1000 may infer a time span from the context (e.g., a brief and record documents in some examples), and present the information to the user. When the time span is not well defined, it may appear on the timeline as a "long event" or may be marked as ambiguous (e.g., confidence is below a threshold). The user may then have the option to add additional information to the document to clarify when the event took place or manually correct the time span information for the event which might be used as feedback to improve the time span inference algorithm. If the user adds more information, the timeline will reflect the new data after the documents are re-analyzed and the event database 110 is updated.

In some examples, selection of an event causes the interactive GUI 108 to automatically display at least a portion of the textual document 105 related to the event or at least one other document related to the event. The interactive GUI 108 may include a plurality of selectable options linked to portions of the textual document 105 or at least one other document (e.g., such as a document from document database 102) such that, when selected, a corresponding portion of the textual document 105 or the at least one other document is annotated. For example, an annotation may include an identifier, icon, comment, numeral, highlight, and/or any other visual representation that associates a portion of the textual document with an event. Displaying a portion of the textual document 105 may include highlighting a subsection of text, emphasizing a subsection of text, enlarging a subsection of text, displaying a subsection of text in a pop-up window, displaying a subsection of text in a frame of the interactive user interface, and/or the like.

In non-limiting embodiments, the event detection and linking engine 100 detects at least one key date or time period associated with at least a subset of events of the plurality of events. This key date or time period may form part of the visual representation shown on the interactive GUI 108. A key date or time period may refer to a date or time period that is directly related to the event (e.g., a starting date and/or time, an ending date and/or time, and/or the like).

In non-limiting embodiments, key dates may be extracted. When a key date is detected, the timeline visualization may help retrieve all records that relate to this date and a list of witnesses. The system may help create memoranda (e.g., for in-house use or the like) or legal briefs that link back to the source documents (e.g., forms, interview notes, transcripts, and/or the like). All documents related to a matter may be parsed, not just the document being edited. In non-limiting embodiments, a timeline may be generated from different perspectives. The retelling of events may differ depending on the perspective. The timeline may show the names of witnesses in a testimony. In non-limiting embodiments, a filter may be applied to select one or more witnesses, places, dates and/or date ranges, and/or the like. For example, a filter may be presented as a drop-down menu or list of witnesses, and upon selection of a witness the timeline may be generated by filtering the data by the selected witness. It will be appreciated that various selectable options may be provided to configure a filter, such as input boxes, check boxes, drop-down menus, lists, tags, and/or the like.

In some non-limiting embodiments, the timeline may show all witnesses for a testimony for key dates. At each key date, the name of each witness may appear as hyperlinked text. The text can be linked to source documents, such as interview notes (e.g., HR investigation) or a transcript (e.g., a witness deposition). The timeline can be generated dynamically from the knowledge graph (e.g., based on the real-time structure of the graph), such that the timeline is a "view" and not a static file. However, in some non-limiting examples, the timeline and/or timeline view may be output (e.g., exported) as one or more static files. In some non-limiting examples, an API may be provided to provide access to the timeline and/or knowledge graph, such that the API may be queried for the timeline and/or specific views of the timeline.

In non-limiting embodiments or aspects, the interactive GUI 108 is generated in a frame of a word processing application. The word processing application may be used by a user to edit the textual document 105 and may parse and process the textual document while the user is editing and/or viewing the textual document 105 through the application. In some examples, the word processing application may include a plug-in extension (e.g., an add-in program, script, and/or tool, such as an application toolbar, web browser extension, or the like) that is configured to parse and process the textual document while the user is editing and/or viewing the textual document 105 through the application. Such a plug-in extension may utilize, for example, one or more APIs of the word processing application to integrate with the same.

In non-limiting embodiments, the view of the events shown in a timeline may be generated dynamically by a query that is related to the user's interest or role (e.g., author, editor, viewer, etc.). For example, an author may be associated with a case of interest, and that case of interest may be associated with a plurality of events (e.g., author→case of interest→events related to that case of interest).

In non-limiting embodiments, the interactive GUI 108 may provide an option to share data, such as one or more views of the interactive GUI 108, with one or more other users and/or computing devices. For example, upon sharing the legal brief, a hyperlink may be created to link to the content for each fact of a timeline (e.g., a source document), link to a record for a legal authority, and/or link within the brief where the fact was identified. In non-limiting examples, the timeline may be embedded in the document (e.g., legal brief). There may be more than one link per fact. Further, the timeline may be configured with different links based on the role of the recipient. For example, the links can be different based on the role of the user reading the legal brief. The link to a legal brief, for example, may be a link to an editable version of the document (e.g., a word processing document) if the user is the author or an editor, or a link to a non-editable version of the document (e.g., a PDF document). The ability to share a timeline or interactive GUI 108 may be provided from within a shared workspace for a team, for example. Each matter or case may be saved as a workspace data structure, and there may be access control rights for each workspace. A workspace may store all documents related to a matter or case. A workspace data structure may include data storage beyond the textual document. In Microsoft Word®, for example, a side panel may show a list of associated matters (workspaces) linked to the user's organization.

Figure 1B:
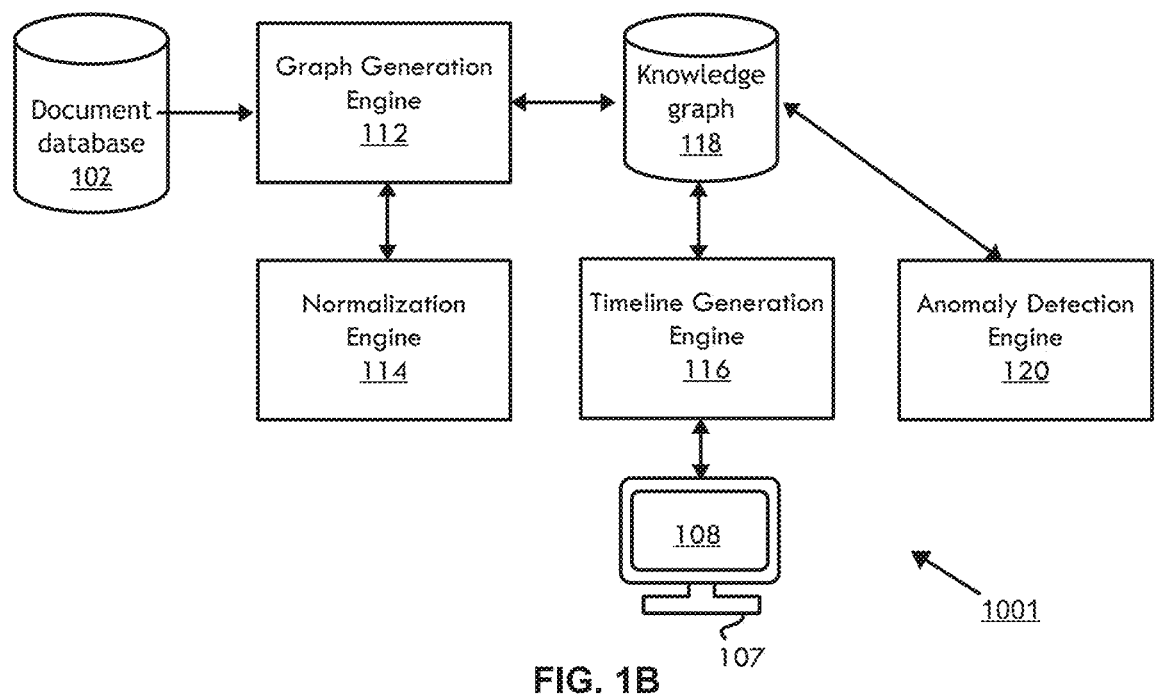
FIG. 1B is another schematic diagram of a system for identifying events in electronic documents and for representing events in an interactive graphical user interface according to non-limiting embodiments.

Referring now to FIG. 1B, depicted is a system 1001 for identifying events and representing events in an interactive GUI according to some non-limiting embodiments. The system 1001 includes a graph generation engine 112, a normalization engine 114, a timeline generation engine 116, and an anomaly detection engine 120, each of which may include one or more computing devices and/or software applications executed by one or more computing devices. In some non-limiting embodiments, the graph generation engine 112, normalization engine 114, timeline generation engine 116, and anomaly detection engine 120 may be part of the event detection and linking engine 101 shown in FIG.

1A, although it will be appreciated that other arrangements are possible. The graph generation engine 112, in non-limiting embodiments, generates a graph based on one or more documents (e.g., briefs and/or records) from parsing documents retrieved from a document database 102 and/or other sources (e.g., uploaded by a user, identified by a network address, and/or the like). The graph may be stored in memory 118.

With continued reference to FIG. 1B, the normalization engine 114 may normalize one or more entity names from the documents and/or the generated graph. For example, the normalization engine 114 may determine that references to "John" and "Mr. Doe" both relate to "John Doe" and, as a result, may change "John" and "Mr. Doe" to "John Doe" in the graph and/or in memory. The normalization engine 114 may normalize one or more entity names before, concurrent with, or after generation of the graph. In non-limiting embodiments, the anomaly detection engine 120 may be configured to compare the knowledge graph stored in memory 118 with one or more rules and/or one or more existing graphs (e.g., standardized graphs created from historical data) and identify anomalies such as missing entities, attributes, or documents, and/or inconsistencies in the data. For example, the anomaly detection engine 120 may compare the knowledge graph in memory 118 for a particular entity to one or more previously-generated knowledge graphs for the same or other entities (e.g., graphs for entities associated with events for a selected entity).

Still referring to FIG. 1B, the timeline generation engine 116 may generate one or more timelines that are visually represented on an interactive GUI 108 of a user computing device 107. The timeline generation engine 116 may generate a visual timeline from the knowledge graph stored in memory 118. In some examples, the timeline generation engine 116 may also output one or more structured data files to represent the events and entities of the knowledge graph such that one or more other systems may process the data file. In non-limiting embodiments, an operator of the user computing device 107 may interact with the knowledge graph and/or timeline. For example, in non-limiting embodiments a user may interact with the timeline to make corrections and/or edits, and such corrections may be used as feedback to train and/or influence one or more algorithms used to generate the timeline (e.g., the timeline generation engine 116). As an example, error terms calculated based on the difference between the generated timeline and the edited timeline may be incorporated into a predictive model.

Figure 2:
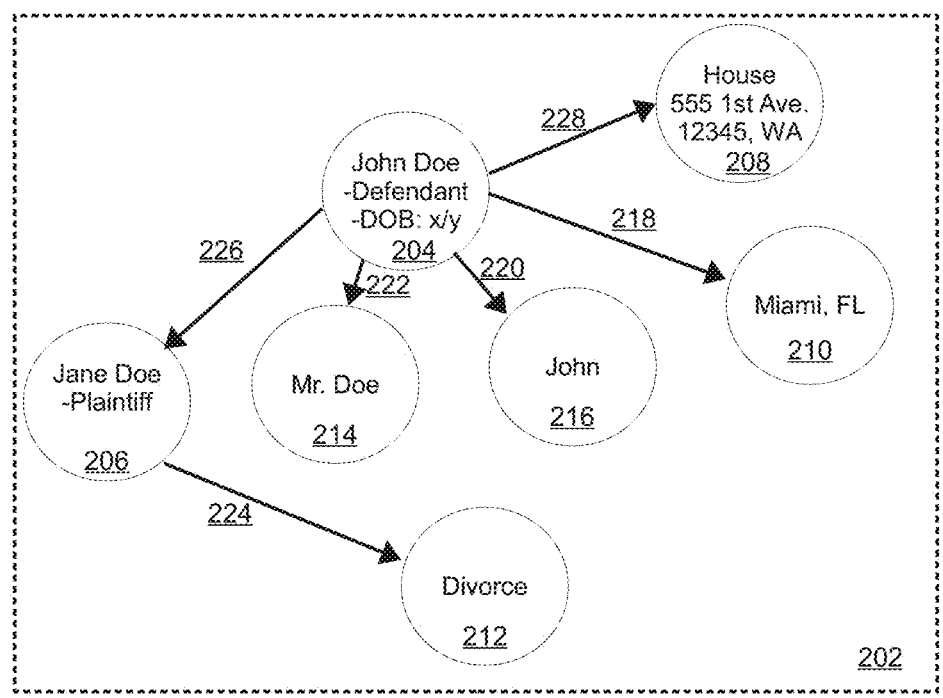
FIG. 2 is a diagram of a knowledge graph used in a system for identifying events in electronic documents and for representing events in an interactive graphical user interface according to non-limiting embodiments.

Referring now to FIG. 2, a graph data structure 202 is shown according to some non-limiting embodiments. Nodes 204, 206, 208, 210, 212, 214, and 216 represent entities. The term "entity," as used herein, refers to a person, living being, object, place, or event. For example, the nodes in FIG. 2 include an entity node 206 for Jane Doe, an entity node 204 for John Doe, an entity node 208 for a house, an entity node 210 for a region, and an entity node 212 for an event. The graph data structure 202 may also include entity nodes that represent the same entity but have different data (e.g., a different spelling) associated with it that results in the creation of a separate entity node. For example, entity nodes 214 and 216 are both aliases of John Doe. Whether the entity nodes 214 and 216 are linked and treated as a single node may be dependent on a confidence score associated with each node.

The entity nodes in the graph data structure 202 are connected based on relation, such that the edges (e.g., connections) 218, 220, 222, 224, 226, and 228 represent a relation between two entities. For example, in the example shown in FIG. 2, connection 226 represents a legal relationship (e.g., married). Connections 220 and 222 both relate entity nodes 214, 216 to entity node 204 as an alias relation. Connection 218 represents a relation between John Doe, entity node 204, and Miami, Florida, entity node 210. The connection 218 may be a relation, showing a connection between John Doe and Florida, or may be as specific as showing that John Doe currently lives in Florida, previously lived in Florida, is planning to travel to Florida, and/or the like. Further, connection 224 represents an action (e.g., initiating a legal proceeding) relating Jane Doe, represented by entity node 206, with a divorce event, represented by entity node 212. Entity nodes may be represented by programmatic objects or other like individual data structures to hold one or more attribute values (e.g., entity type, entity details, and/or the like). For example, entity node 204 may store an entity type having the value of "person," and one or more attributes specific to a person entity type such as, for example, a name, date of birth, age, and/or the like. As another example, entity node 208 may store an entity type having the value of "location" or "object," and one or more attributes specific to a location or object entity type such as, for example, an address or coordinates. In non-limiting embodiments, related entity nodes may include at least one subject entity node (e.g., entity node 204 representing a person) and at least one object entity node (e.g., entity node 208 representing an object).

Figure 3:
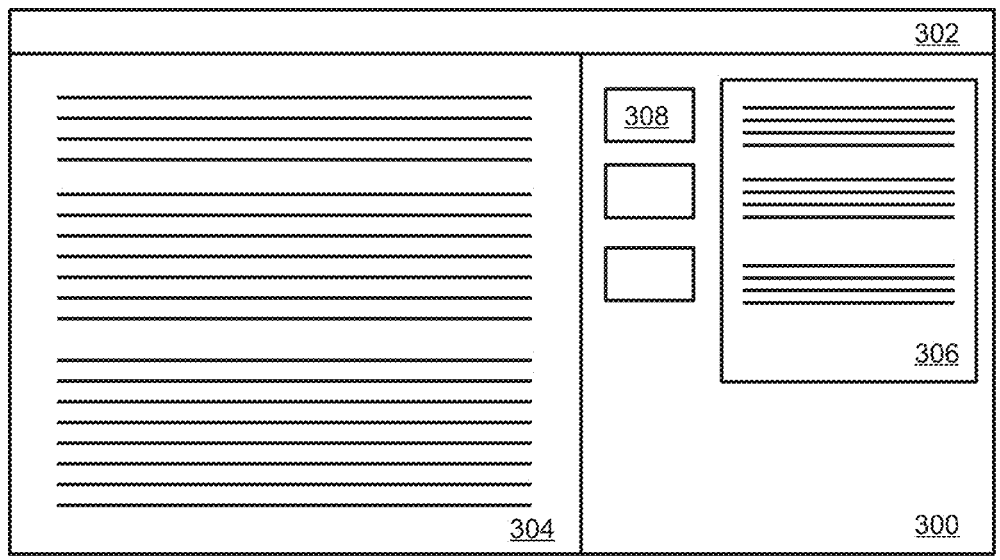
FIG. 3 is a view of a graphical user interface according to non-limiting embodiments.

Referring now to FIG. 3, a GUI 300 is shown as part of a window in a word processing application 302 according to non-limiting embodiments. The word processing application 302 includes a text editing window 304 in which a textual document is shown and edited. The GUI 300 may include one or more tools for interacting with the textual document, such as one or more timeline tools 308. The GUI 300 may include a preview window 306 showing a second textual document (e.g., such as a source document). In non-limiting embodiments, the GUI 300 may facilitate a user to upload documents (e.g., submit additional documents to a database or library of documents) and to generate and/or view a timeline of events based on the textual document in the text editing window 304 and/or the documents in a document database.

Figure 4:
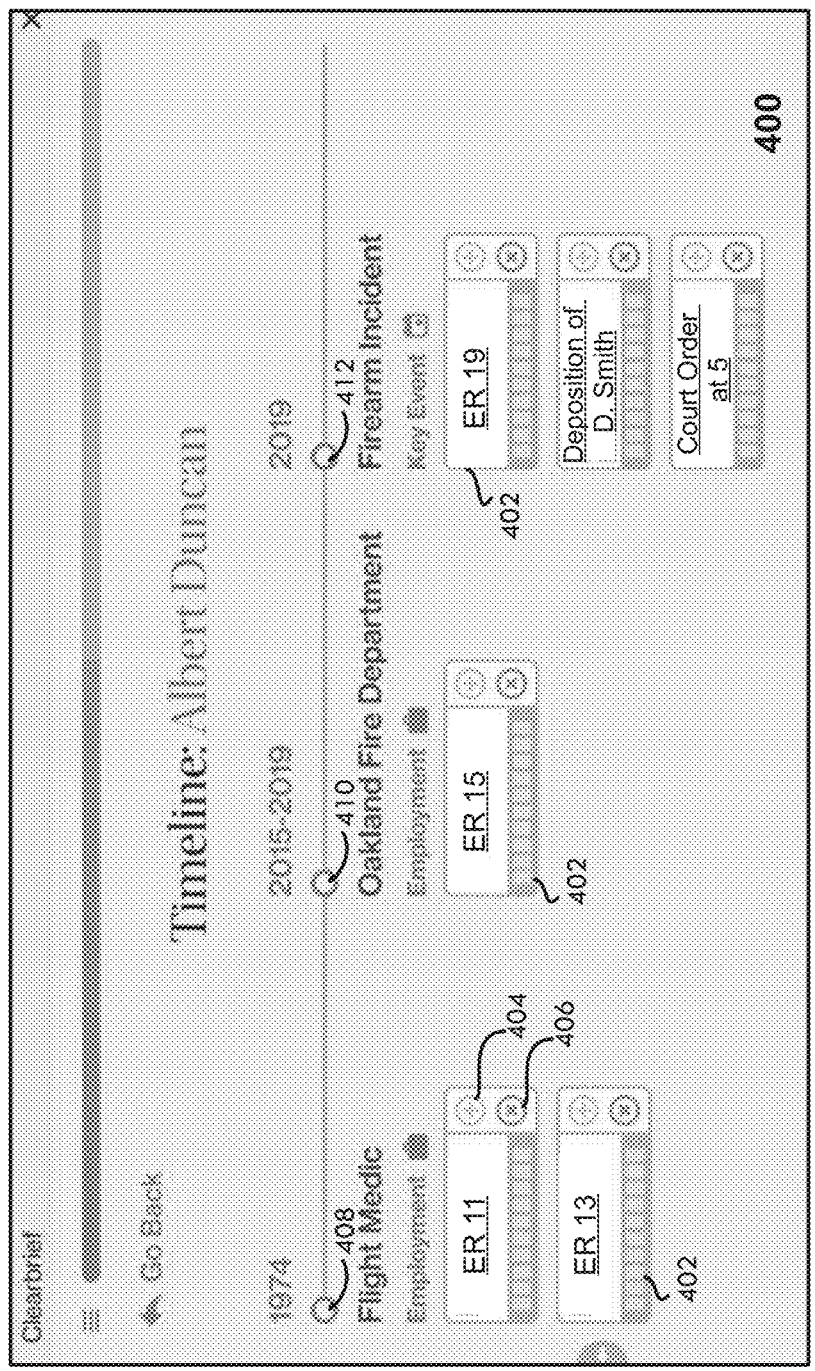
FIG. 4 is another view of a graphical user interface according to non-limiting embodiments.

Referring now to FIG. 4, a timeline GUI 400 is shown according to non-limiting embodiments. In some examples, the timeline GUI 400 may be part of a window in a word processing application (e.g., GUI 300 in FIG. 3). The timeline GUI 400 shows an example timeline for an entity ("Albert Duncan") based on a plurality of events involving that entity. For example, after one or more textual documents have been parsed, the event database may be queried based on an entity. Such a database query may occur upon user request, such as selecting and/or inputting the name of an entity. For example, a user may identify a person, place, organization, and/or the like to generate a timeline for the entity. In some non-limiting embodiments, the timeline GUI 400 may be automatically generated in response to the return of the query.

As shown in FIG. 4, the timeline GUI 400 may show the events associated with the entity in chronological sequence. In the depicted example, the events include employment as a flight medic in 1974 and by the Oakland Fire Department in 2015-2019. The depicted events also include a firearm incident that occurred in 2019. Although specific dates and date ranges may not be known or determinable from the document(s), enough data is available to place the three events into a chronological sequence. In non-limiting embodiments, a plurality of source documents (e.g., excerpts of record ("ER"), deposition transcript, and a court order) corresponding to events are also identified and shown as document objects 402 on the timeline GUI 400. The document objects 402 in some examples may be depicted as cards as in FIG. 4. The document objects 402 may include a hyperlink to display the corresponding document, a first selectable option 404 for positive feedback, and a second selectable option for negative feedback 406. In non-limiting embodiments the positive feedback may confirm that the corresponding source document (e.g., "ER 11") is accurate. In some non-limiting embodiments, one or more document objects (e.g., cards) may identify a portion (e.g., line, paragraph, page, and/or the like) of the textual document (e.g., a brief being edited in a word processing application) and link to that portion of the document such that selection of the document object or a link thereon causes the portion to be displayed. In some non-limiting embodiments, different colors or other visual indicators (e.g., icons or the like) may be used to identify a source of the document identified by a document object 402. For example, a document object for an excerpt of record may be green, a document object for a deposition transcript may be blue, and a document object pointing to a portion of the textual document may be orange. Other visual indicators and/or color arrangements may be used.

In some examples, the document objects 402 may be predictions for citations to be inserted into the textual document. In such examples, positive feedback may result in the citation being inserted into the document. In some examples, negative feedback may be used to train or more models (e.g., a model to predict source documents and/or citations to source documents).

Figure 5:
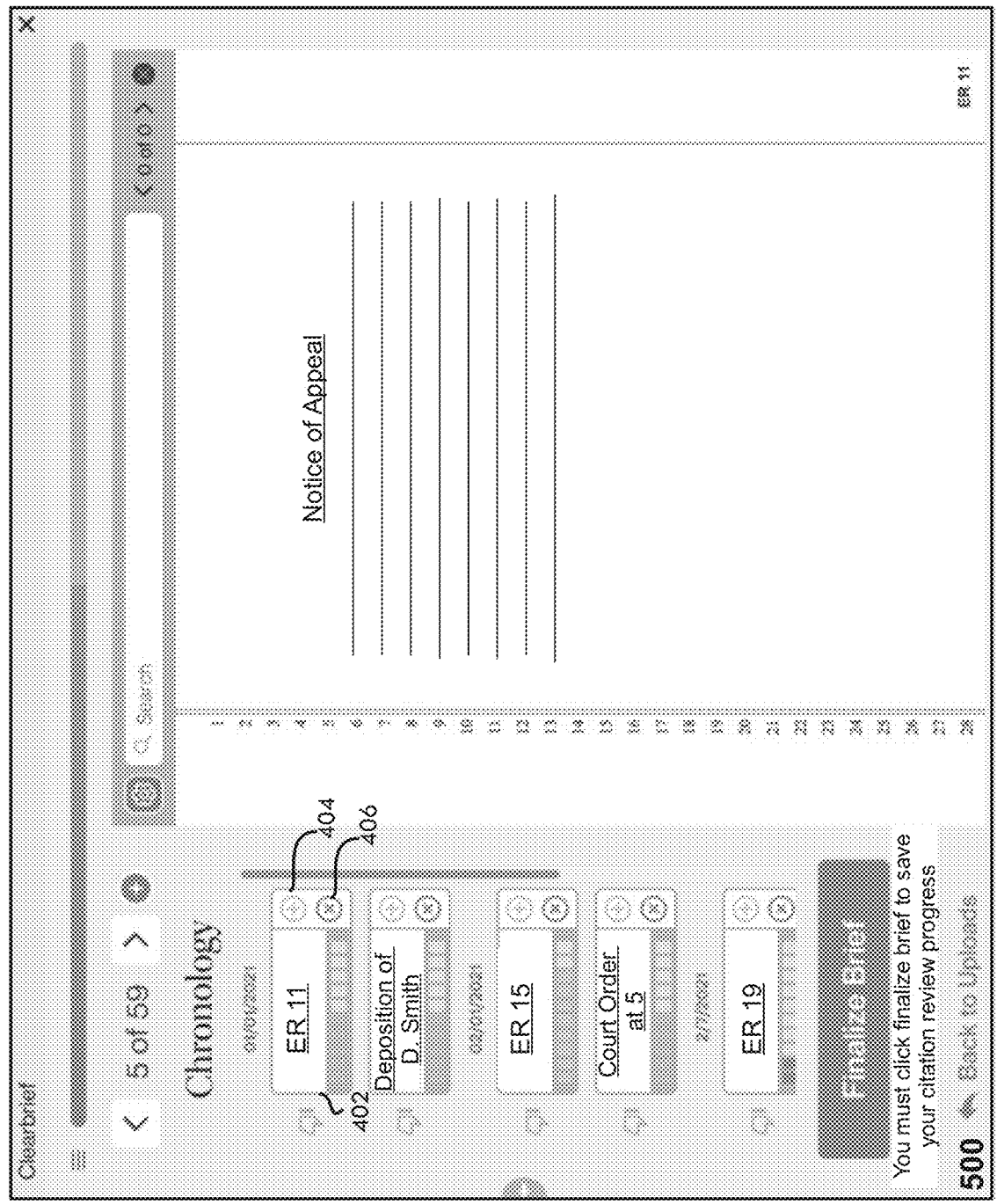
FIG. 5 is another view of a graphical user interface according to non-limiting embodiments.

Referring now to FIG. 5, a chronology GUI 500 is shown according to non-limiting embodiments. In some examples, the chronology GUI 500 may be part of a window in a word processing application (e.g., GUI 300 in FIG. 3). As shown, the chronology GUI 500 shows document objects 402 in an ordered sequence by date, such that each relevant date is displayed with corresponding document objects 402 that relate to that date (e.g., referencing the date or events associated with the date).

Figure 6:
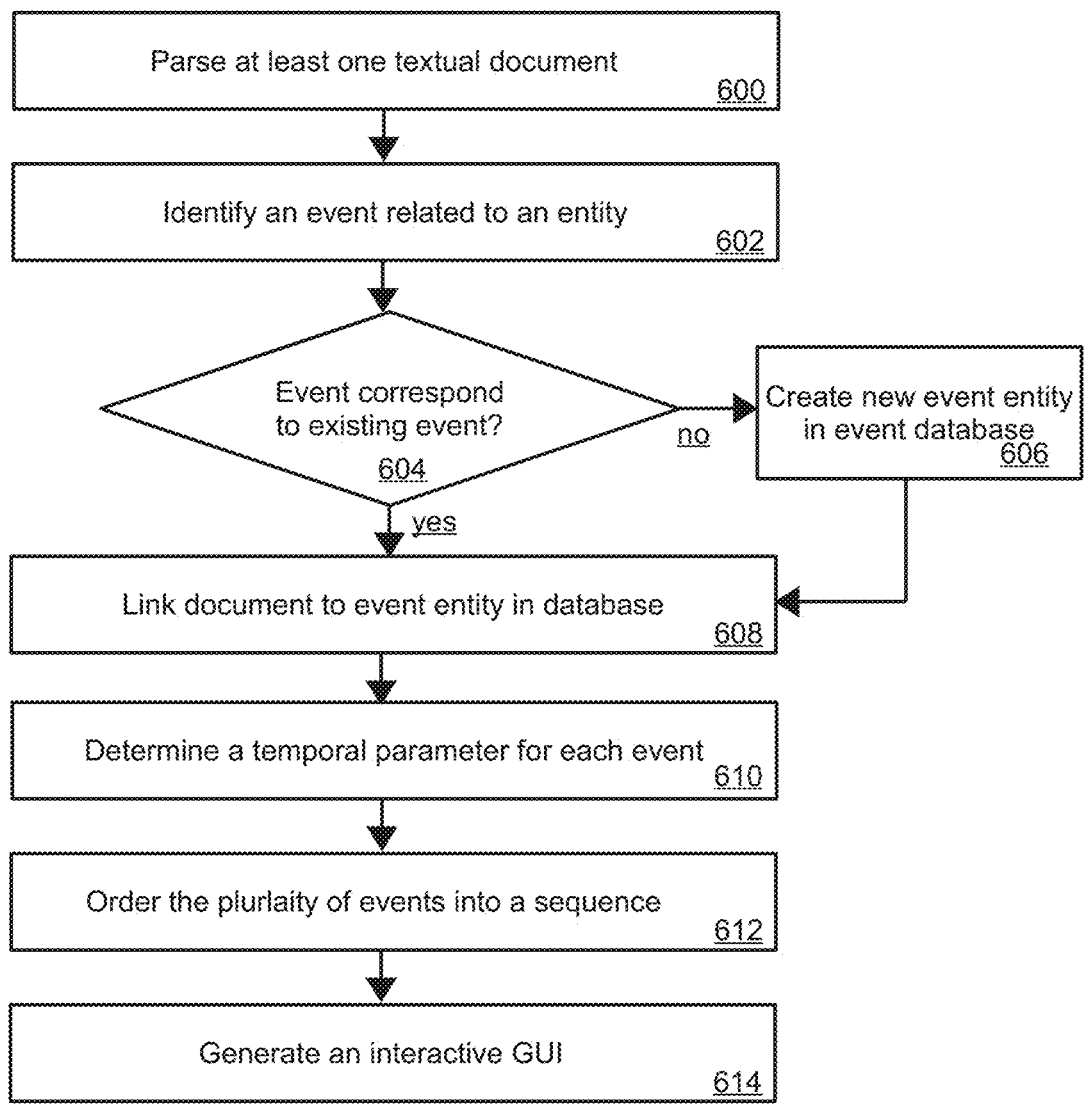
FIG. 6 is a flow diagram of a system for identifying events in electronic documents and for representing events in an interactive graphical user interface according to non-limiting embodiments.

Referring now to FIG. 6, a flow diagram for identifying events and representing a plurality of events in an interactive GUI is shown according to non-limiting embodiments. The steps shown in FIG. 6 are for example purposes only, and it will be appreciated that additional, fewer, different, and/or a different order of steps may be used in non-limiting embodiments. At step 600, one or more textual documents are parsed. The document(s) may be uploaded, selected, and/or the like. In some examples, a textual document currently open by a word processing application may be parsed as a target document. In some examples, a user may specify an entity (e.g., a person, corporation, place, and/or the like) to direct the parsing. At step 602, during the parsing, an event is identified that is related to an entity (e.g., such as an entity specified by a user). An event may be identified with a portion of a textual document (e.g., a string including a portion of a sentence or multiple sentences).

At step 604 of FIG. 6, for each event identified at step 602, it is determined if the event corresponds to an existing event in an event database. For example, the portion of the textual document and/or an event entity derived from the portion of the textual document may be compared against the event database to find a match. If the event is not in the event database (e.g., if the event entity is not recorded in the event database), the method may proceed to step 606 and a new event entity may be created in the event database. If the event is in the event database (e.g., if the event entity is recorded in the event database), the method may proceed directly to step 608. At step 608, the textual document (e.g., the portion of the textual document identifying the event) is linked to the event entity in the event database. For example, linking may include embedding metadata such as a pointer into the document and/or recording, in the event database, the portion of the textual document or a location of the same within the document.

At step 610 of FIG. 6, a temporal parameter may be determined for each event identified in the textual document. For example, a temporal parameter may be determined from an explicit recitation of a time and/or date. In other examples, a temporal parameter may be a relative parameter (e.g., before, after, or during an event). As explained herein, one or more predictive models may be used in some non-limiting embodiments to determine the temporal parameter(s). The temporal parameter(s) may be stored in the event database in association with the corresponding event entity. At step 612, the events may be ordered into a sequence based on the associated temporal parameter(s). This may include, for example, ordering the events associated with temporal parameters having explicit times and/or dates and then arranging any remaining events among the ordered events based on relative temporal parameters and/or probable temporal parameters. In some non-limiting embodiments, the sequence may be checked for anomalies and/or inconsistencies. At step 614, an interactive GUI is generated based on the ordered sequence of events. Other outputs may include a textual summary, a structured data file, and/or the like.

Although several of the examples discussed herein relate to legal documents, such as legal briefs and memoranda, it will be appreciated that the systems and methods may be applied to any type of textual documents including facts, such as reports (e.g., customer service reports, insurance claim documentation, police reports, and/or the like), research papers, articles, and/or the like. Non-limiting embodiments may speed up the reading and improve comprehension of any type of textual document containing facts. There are multiple situations where a visual timeline can be used for conveying information about facts in a concise and clear manner. In companies, the human resources (HR) department can start investigating particular employees responsive to complaints. These investigations may be documented in textual documents that contain facts that can be extracted automatically and shared as a visual timeline using non-limiting embodiments of the systems and methods described herein.

Figure 7:
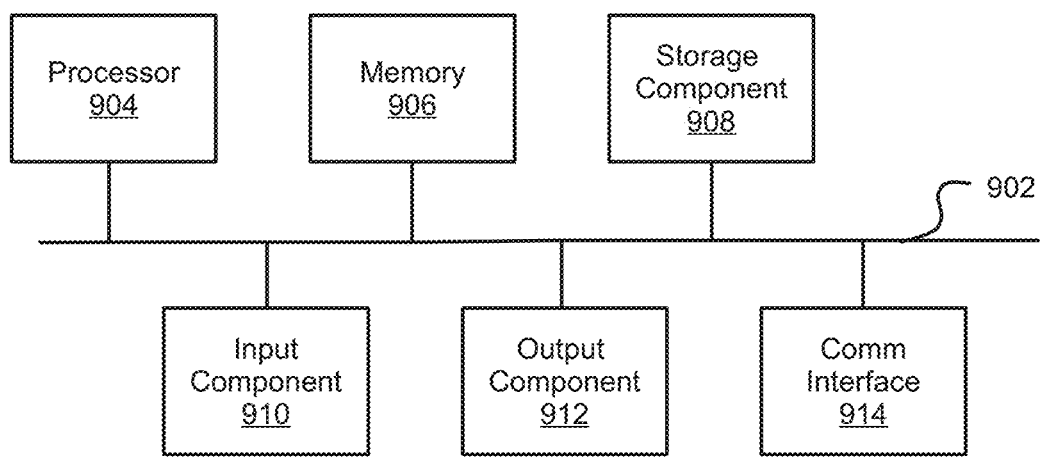
FIG. 7 illustrates example components of a device used in connection with non-limiting embodiments.

Referring now to FIG. 7, shown is a diagram of example components of a device 900 according to non-limiting embodiments. Device 900 may correspond to the event detection and linking engine 101 shown in FIG. 1A, as an example. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 7. Additionally, or alternatively, a set of components (e.g., one or more components) of device 900 may perform one or more functions described as being performed by another set of components of device 900.

As shown in FIG. 7, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 7, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for representing a plurality of events in an interactive graphical user interface, comprising:
   parsing at least one textual document to identify a plurality of events related to at least one entity;
   determining a temporal parameter for each event of the plurality of events based on the at least one textual document, the temporal parameter for at least one event of the plurality of events comprising a start time parameter and an end time parameter, wherein determining the start time parameter and the end time parameter for the at least one event comprises:
      determining multiple temporal parameters for the at least one event, the multiple temporal parameters representing multiple timespans for the at least one event; and
      selecting the start time parameter and the end time parameter from the multiple temporal parameters that represent a shortest timespan of the multiple timespans for the at least one event;
   ordering the plurality of events into a sequence based on the temporal parameter for each event; and
   generating an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

2. The computer-implemented method of claim 1, wherein the visual representation of the plurality of events comprises a plurality of selectable options linked to portions of the textual document or the at least one other document such that, when selected, a corresponding portion of the textual document or the at least one other document is annotated.

3. The computer-implemented method of claim 1, wherein displaying the at least a portion of the textual document or at least one other document comprises at least one of the following: highlighting a subsection of text, emphasizing a subsection of text, enlarging a subsection of text, displaying a subsection of text in a pop-up window, displaying a subsection of text in a frame of the interactive graphical user interface, or any combination thereof.

4. The computer-implemented method of claim 1, wherein the interactive graphical user interface is configured to display the at least one other document in response to user interaction with the visual representation, the at least one other document comprising at least one of the following: an article, a statute, a court order, an exhibit, a note, or any combination thereof.

5. The computer-implemented method of claim 1, further comprising detecting at least one key date or time period associated with at least a subset of events of the plurality of events, wherein the visual representation comprises the at least one key date or time period.

6. The computer-implemented method of claim 1, wherein the visual representation identifies at least one event of the plurality of events in association with at least one entity of a plurality of entities.

7. The computer-implemented method of claim 1, further comprising sharing the interactive graphical user interface with at least one other user.

8. The computer-implemented method of claim 1, wherein the interactive graphical user interface is generated in a frame of a word processing application.

9. The computer-implemented method of claim 1, further comprising:
generating a textual summary based on the at least one textual document and the sequence.

10. The computer-implemented method of claim 8, wherein the word processing application comprises a plug-in extension configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface.

11. The computer-implemented method of claim 1, wherein parsing the at least one textual document to identify the plurality of events comprises:
determining, for each portion of the at least one textual document associated with an event of the plurality of events, if the event corresponds to an existing event in an event database; and
in response to determining that the event corresponds to the existing event or does not correspond to the existing event, determining to: (i) link the portion of the at least one textual document to an event entity for the existing event or (ii) create a new event entity in the event database and link the portion of the at least one textual document to the new event entity.

12. A system for representing a plurality of events in an interactive graphical user interface, comprising:
at least one processor programmed or configured to:
parse at least one textual document to identify a plurality of events related to at least one entity;
determine a temporal parameter for each event of the plurality of events based on the at least one textual document, the temporal parameter for at least one event of the plurality of events comprising a start time parameter and an end time parameter, wherein determining the start time parameter and the end time parameter for the at least one event comprises:
determining multiple temporal parameters for the at least one event, the multiple temporal parameters representing multiple timespans for the at least one event; and
selecting the start time parameter and the end time parameter from the multiple temporal parameters that represent a shortest timespan of the multiple timespans for the at least one event;
order the plurality of events into a sequence based on the temporal parameter for each event; and
generate an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

13. The system of claim 12, wherein the visual representation of the plurality of events comprises a plurality of selectable options linked to portions of the textual document or the at least one other document such that, when selected, a corresponding portion of the textual document or the at least one other document is annotated.

14. The system of claim 12, wherein displaying the at least a portion of the textual document or at least one other document comprises at least one of the following: highlighting a subsection of text, emphasizing a subsection of text, enlarging a subsection of text, displaying a subsection of text in a pop-up window, displaying a subsection of text in a frame of the interactive graphical user interface, or any combination thereof.

15. The system of claim 12, wherein the interactive graphical user interface is configured to display the at least one other document in response to user interaction with the visual representation, the at least one other document comprising at least one of the following: an article, a statute, a court order, an exhibit, a note, or any combination thereof.

16. The system of claim 12, wherein the at least one processor is further programmed or configured to detect at least one key date or time period associated with at least a subset of events of the plurality of events, and wherein the visual representation comprises the at least one key date or time period.

17. The system of claim 12, wherein the visual representation identifies at least one event of the plurality of events in association with at least one entity of a plurality of entities.

18. The system of claim 12, wherein the interactive graphical user interface is generated in a frame of a word processing application.

19. The system of claim 12, wherein the at least one processor is further programmed or configured to:
generate a textual summary based on the at least one textual document and the sequence.

20. The system of claim 18, wherein the word processing application comprises a plug-in extension configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface.

21. The system of claim 12, wherein parsing the at least one textual document to identify the plurality of events comprises:
determining, for each portion of the at least one textual document associated with an event of the plurality of events, if the event corresponds to an existing event in an event database; and
in response to determining that the event corresponds to the existing event or does not correspond to the existing event, determining to: (i) link the portion of the at least one textual document to an event entity for the existing event or (ii) to create a new event entity in the event database and link the portion of the at least one textual document to the new event entity.

22. A computer program product comprising a non-transitory computer-readable medium including program instructions that, when executed by at least one processor, cause the at least one processor to:
  parse at least one textual document to identify a plurality of events related to at least one entity;
  determine a temporal parameter for each event of the plurality of events based on the at least one textual document, the temporal parameter for at least one event of the plurality of events comprising a start time parameter and an end time parameter, wherein determining the start time parameter and the end time parameter for the at least one event comprises:
    determining multiple temporal parameters for the at least one event, the multiple temporal parameters representing multiple timespans for the at least one event; and
    selecting the start time parameter and the end time parameter from the multiple temporal parameters that represent a shortest timespan of the multiple timespans for the at least one event;
  order the plurality of events into a sequence based on the temporal parameter for each event; and
  generate an interactive graphical user interface comprising a visual representation of the plurality of events on a user device based on the sequence, the visual representation of the plurality of events linked to a textual document of the at least one textual document such that selection of an event causes the interactive graphical user interface to display at least a portion of the textual document related to the event or at least one other document related to the event.

23. The computer program product of claim 22, wherein the visual representation of the plurality of events comprises a plurality of selectable options linked to portions of the textual document or the at least one other document such that, when selected, a corresponding portion of the textual document or the at least one other document is annotated.

24. The computer program product of claim 22, wherein displaying the at least a portion of the textual document or at least one other document comprises at least one of the following: highlighting a subsection of text, emphasizing a subsection of text, enlarging a subsection of text, displaying a subsection of text in a pop-up window, displaying a subsection of text in a frame of the interactive graphical user interface, or any combination thereof.

25. The computer program product of claim 22, wherein the interactive graphical user interface is configured to display the at least one other document in response to user interaction with the visual representation, the at least one other document comprising at least one of the following: an article, a statute, a court order, an exhibit, a note, or any combination thereof.

26. The computer program product of claim 22, wherein the program instructions further cause the at least one processor to detect at least one key date or time period associated with at least a subset of events of the plurality of events, and wherein the visual representation comprises the at least one key date or time period.

27. The computer program product of claim 22, wherein the visual representation identifies at least one event of the plurality of events in association with at least one entity of a plurality of entities.

28. The computer program product of claim 22, wherein the interactive graphical user interface is generated in a frame of a word processing application.

29. The computer program product of claim 22, wherein the program instructions further cause the at least one processor to:
  generate a textual summary based on the at least one textual document and the sequence.

30. The computer program product of claim 28, wherein the word processing application comprises a plug-in extension configured to parse the at least one textual document to identify the plurality of events based on the at least one entity, determine the temporal parameter for each event of the plurality of events based on the at least one textual document, order the plurality of events into the sequence based on the temporal parameter for each event, and generate the interactive graphical user interface.

* * * * *